United States Patent [19]

Toda et al.

[11] Patent Number: 4,549,391
[45] Date of Patent: Oct. 29, 1985

[54] WIRE-LIKE STRUCTURE TWISTING MACHINE

[75] Inventors: Yuichi Toda; Katsuji Sakamoto; Shigeru Tanaka; Yuji Kameo, all of Kanagawa, Japan

[73] Assignee: Sumitomo Electric Industries, Ltd., Osaka, Japan

[21] Appl. No.: 571,751

[22] Filed: Jan. 17, 1984

[30] Foreign Application Priority Data

Jan. 17, 1983 [JP] Japan .................. 58-6329

[51] Int. Cl.⁴ .................. D07B 3/06; D07B 7/02
[52] U.S. Cl. .................. 57/13; 57/15; 57/59; 57/102
[58] Field of Search .................. 57/3, 12, 59, 13–16, 57/19, 58.52, 58.54, 62–65, 66.5, 100, 102

[56] References Cited

U.S. PATENT DOCUMENTS

| | | | |
|---|---|---|---|
| 2,208,914 | 7/1940 | Van Hook | 57/15 |
| 2,238,496 | 4/1941 | McDonald | 57/15 X |
| 2,412,196 | 12/1946 | Ashbaugh et al. | 57/59 |
| 2,802,328 | 8/1957 | Ritchie | 57/13 |
| 3,106,815 | 10/1963 | Nance et al. | 57/13 |
| 3,651,629 | 3/1972 | Webster | 57/13 |
| 3,726,075 | 4/1973 | Akachi | 57/59 |

Primary Examiner—John Petrakes
Attorney, Agent, or Firm—Sughrue, Mion, Zinn, Macpeak & Seas

[57] ABSTRACT

A wire-twisting machine for twisting individual wire-like structures into a cable, having a plurality of bobbins around which are wound the wire-like substance to be twisted, the bobbins being mounted on individual cradles which are supported at either end by disks secured to a common spindle, comprising: a drive mechanism having prime movers which are external to the bobbin-cradle assembly for controlling the speed of feeding the wire-like structure from its respective bobbin, thus resulting in constant wire-like structure tension, and another drive mechanism for controlling cradle rotation for fixing or adjusting the amount of twisting-back in said cable.

6 Claims, 7 Drawing Figures

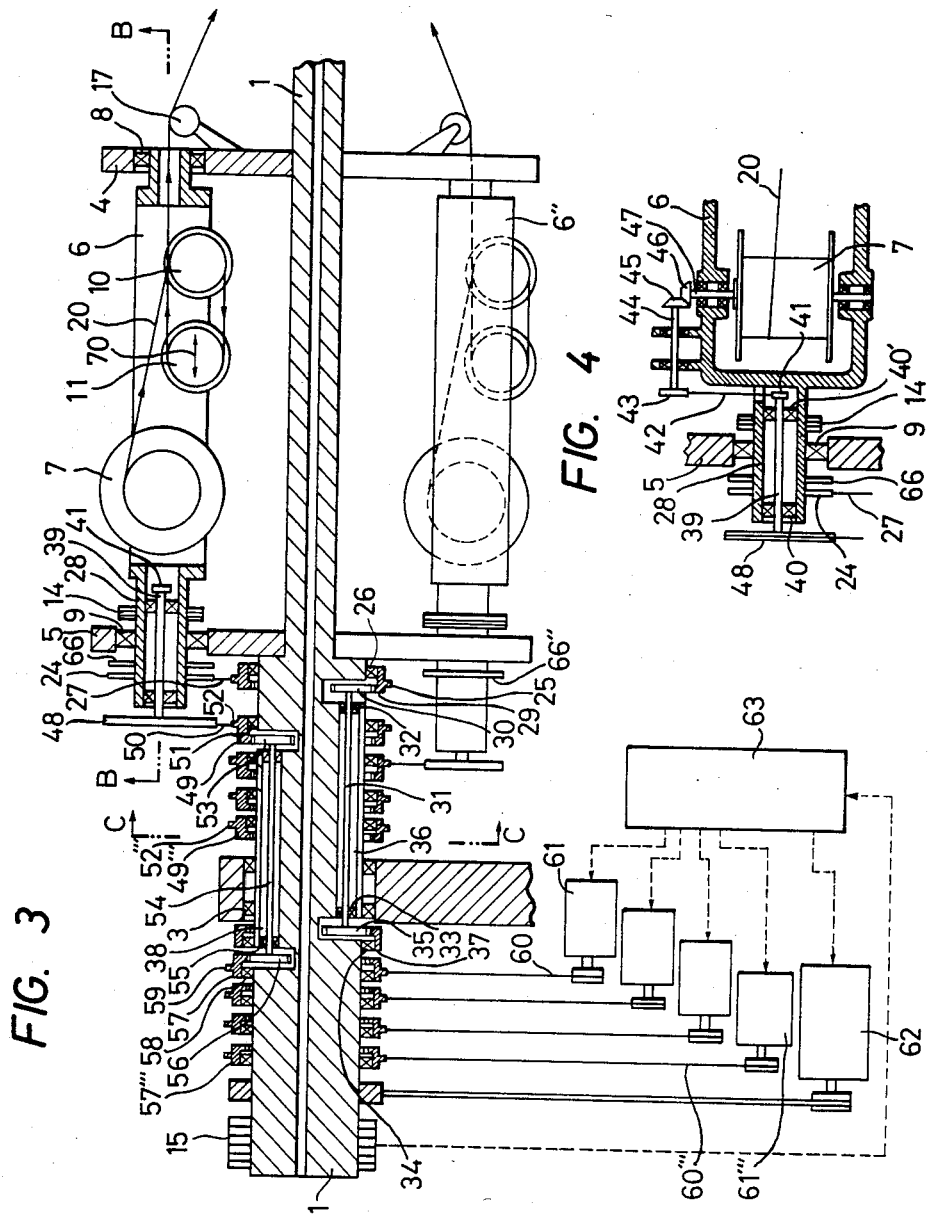

WIRE-LIKE STRUCTURE TWISTING MACHINE

BACKGROUND OF THE INVENTION

A. Field of the Invention

The present invention relates to an improvement in a cage type wire twisting machine for twisting wire-like structures which have weak tensile strength, such as communication wires, optical fiber core wires, or the like, into a cable.

B. Description of the Prior Art

In common practice, a plurality of communication wires, optical fiber core wires, or the like, are twisted into a cable, and a plurality of such individual cables are in turn gathered into a larger cable. Among the several kinds of twisting machines used for this purpose, a cage type twisting machine is one of the most widely used. With this machine, it is possible to perform twisting while effecting twisting-back. This prevents internal distortion from occurring due to the twisting of the wire-like structures and also prevents the twisted wire-like structures from untwisting at the end, when cut. Twisting-back is particularly important in the case of optical fiber core wires because internal distortion may deteriorate significantly optical performance. Further, in the case of wire-like structures having weak tensile strength, it is necessary to maintain the tension of the wire-like substance in the wire-twisting machine at a constant low level. To achieve this end, feeding speed of the wire structure supply bobbin is controlled by a variable speed motor, as is conventionally known.

In a conventional cage type wire twisting machine, as shown in FIGS. 1, 1a and 2, a spindle 1 is rotatably supported by bearings 2 and 3 provided on a stand for the machine. Disks 4 and 5 are fixed on the spindle 1 which is rotated by a driving electric motor 62. A cradle 6 is rotatably supported by bearings 8 and 9 respectively provided between the disks 4 and 5. Bobbin 7 on which a wire-like structure is wound is rotatably held by the cradle 6. A plurality of cradles 6 corresponding to the number of the wire-like structures to be twisted are disposed circumferentially around and coaxially with the spindle 1 as shown in FIG. 2, and the cradles are arranged such that they revolve with the disks 4 and 5 around the spindle 1. Each cradle does not turn on its own axis as the spindle 1 rotates, so as to maintain a constant plane and thereby to prevent the wire-like substance from twisting. This is referred to as a "twisting-back operation". As shown in FIGS. 1 and 1a, guide rollers 10 and 11 are provided in the cradle 6. Guide roller 10 has a fixed shaft while guide roller 11 is arranged to be slidable in the direction of arrow 70 along guide rails 13. The wire-like structure 20 is fed from the bobbin 7 and further fed through the guide rollers 10 and 11. In this case, the position of the guide roller 11 is detected by position detector (not shown in the Drawing). A detection signal is fed back to a controller 16 provided in the cradle 6 to control the rotation of the bobbin 7 driven by a bobbin driving motor 12 through a belt 12' to control the wire-like structure feeding speed so as to put the guide roller 11 always at a substantially fixed position. Accordingly, the wire-like structure 20 is fed out of the bobbin 7 with substantially zero tension. The controller 16 and the motor 12 are energized from an external power source through slip rings 14 and 15. A tension application device (not shown in the Drawing) is incorporated into the guide roller 11 to maintain constant the tension of the wire-like structure 20. The wire-like structure 20 advances from the guide roller 11 to an axis hole of the cradle 6 and a guide roller 17 attached to the disk 4 through strap 18 of spindle 1 and finally through a twisting die 19 into twisted cable 72. In this apparatus, the wire-like structure 20 is fed out of the bobbin 7 with substantially zero tension due to the function of the controller 16 and the variable speed driving motor 12 in accordance with the position of the guide roller 11. The tension acting on the wire-like structure when it is twisted is only that applied by the tension application device of the guide roller 11 so that the twisting operation can be performed with a constant low tension. Further, as shown in the Drawing, a hole may be formed through the spindle at its center and a core wire 73 may be passed through the hole so that the wire-like structures 20 may be twisted around the core wire. Further, a brake 74 is provided on the spindle 1 for additional control of the wire-like structure twisting machine.

In the conventional twisting machine as described above, with reference to the Drawing, electric devices, such as the controller 16, the driving motor 12, or the like, are individually incorporated into each cradle 6 which revolves. This increases the size of the cradle-disk assembly and results in a large diameter of revolution. Accordingly, much vibration and a large centrifugal force are always present at the controller when the cradle is revolving. Consequently, such wire twisting machines have operational disadvantages especially with respect to the mechanical parts, particularly such as relays, switches, or the like, resulting in malfunctions and a tendency for occurrence of faults. Further, there is a disadvantage that since the controller and the motor are individually disposed in the respective cradle, the cradle is large in mass, size and its diameter of revolution so as to be more affected by the centrifugal force. Further, since the controller and motor are individually disposed in each respective cradle, the entire construction is complicated and maintenance is difficult.

OBJECTS OF THE INVENTION

It is an object of this invention to provide a cage type wire-twisting machine wherein the machine components, especially the control components, are subject to reduced vibration which lessens component fatigue.

It is another object of this invention to provide a cage type wire-twisting machine which is subject to reduced centrifugal forces which allows faster operating speeds.

It is a further object of the present invention to provide a simplified cage type wire-twisting machine which is less likely to malfunction and which is easier to maintain.

SUMMARY OF THE INVENTION

The wire-twisting machine according to the present invention controls the speed of feeding a wire-like structure from a bobbin on which the wire-like structure is wound in each cradle to maintain constant tension of the wire-like structures to be twisted. To this end, the rotation of the bobbins in the respective cradles is driven by a first group of internal gear rings provided coaxially with a cradle shaft. The first group of internal gear rings are coupled through gears and shafts with a second group of internal gear rings in the axial direction of the spindle. The second group is driven by a group of variable speed motors provided outside the wire-twisting machine. Thus, the twisting machine of the present invention has advantages and effects which are not found in prior art wire-twisting machines. Specifically, since the controller and the variable motor are not provided in the cradles, each cradle can be made smaller and lighter. Moreover, the radius of revolution of the cradle can be reduced so that the diameter of the entire cage can be smaller. This reduces the influence of the centrifugal force which allows the operation speed of the twisting machine to be increased. Since the complicated electric controller and variable speed motors are provided outside the twisting machine, they do not receive mechanical vibrations and centrifugal force, resulting in fewer malfunctions and faults. Since the electrical controllers are not individually provided in the cradles, they may be arranged as a central controller which reduces construction costs. Finally, since it is not necessary to incorporate the controllers and variable speed motors into the cage, that structure is simplified and maintenance is facilitated.

In addition, the invention comprises cradle drive wheels which may be fixed or movable with respect to the spindle to adjust the twisting back angle of the cable.

BRIEF DESCRIPTION OF THE DRAWING

FIG. 3 is a front view, partly in section with respect to the main part, of the twisting machine according to a preferred embodiment of the present invention;

FIG. 4 is a cross-section of the device shown in FIG. 3 taken from the view-point B—B;

DESCRIPTION OF THE PREFERRED EMBODIMENTS

Figure 1:
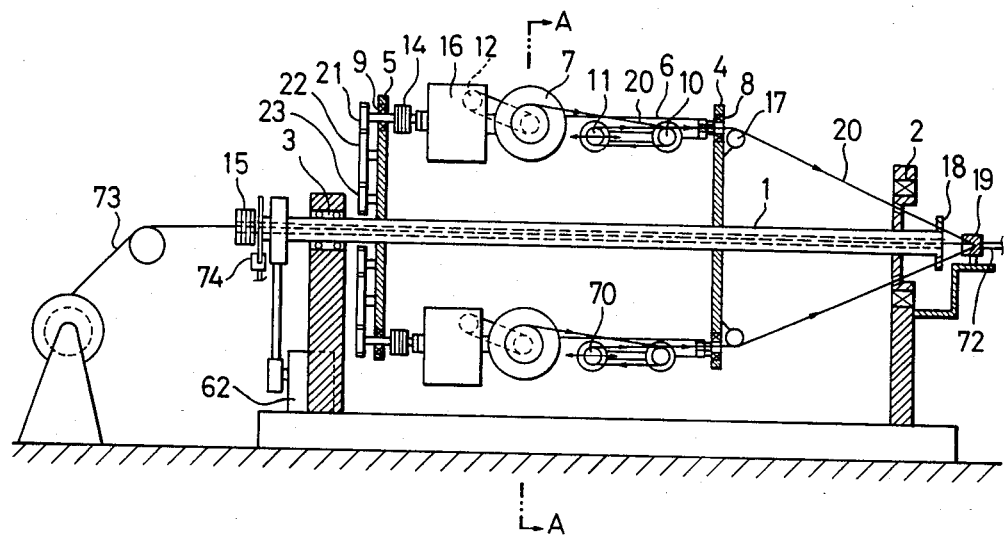
FIG. 1 is a front view, partly in section, of the conventional twisting machine.
Figure 1A:
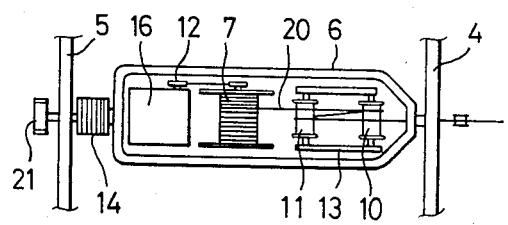
FIG. 1a is a plan view of the cradle portion of the same.
Figure 2:
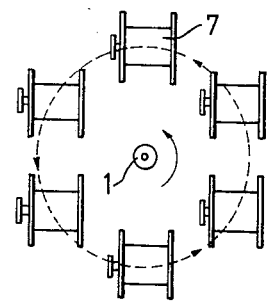
FIG. 2 is a cross-section of the device shown in FIG. 1 taken from view point A—A illustrating the state of revolution of the cradles.

Referring to FIGS. 3 through 6 of the Drawing, a preferred embodiment of the present invention now will be described. FIG. 3, with like numbers referring to like components throughout, is a front view, partly in section as to the main portion, of a preferred embodiment of a twisting machine provided with four cradles. In the present invention, the arrangement of the spindle and the cradles, the construction of the guide rollers, the feeding path of the wire-like substances, etc., are the same as those in the conventional case and the same reference numerals used in FIG. 3 of the Drawing designate the same part as in the conventional apparatus as described hereinabove with respect to FIGS. 1 and 2. In the present invention, however, the controllers and the driving motors are not provided in each cradle.

The construction of the present invention will now be described. Particularly, the operation of controlling the twisting-back of the wire-like structures will be described first hereunder. A chain sprocket 24 is provided on a rotary shaft 28 of the cradle 6 on the side of the disk 5 and is coupled with a chain wheel 25 through a chain 27. The chain wheel 25 is provided on the outside of an internal gear ring 29 and is rotated by a rotation transmission device having an internal gear rotatably supported on the spindle 1 through a bearing 26, a gear 30 which engages with the internal gear of the internal gear ring 29, a rotary shaft 31 of the gear 30 rotatably supported by a pair of bearings 32 and 33 in a hole 36 of the spindle 1, and a gear 35 provided at the other end of the shaft 31. The gear 35 engages with an internal gear ring 37 rotatably supported on the spindle through a bearing 34. In this arrangement, the internal gear rings 37 and 29 rotate with each other with respect to free space even if the spindle 1 is rotating, if the relation among the respective numbers of teeth is set as follows:

$$(T_{35}/T_{37}) \times (T_{29}/T_{30}) = 1$$

where $T_{37}$, $T_{35}$, $T_{30}$ and $T_{29}$ represent the number of teeth of the internal gear of the internal gear ring 37, the number of teeth of the gear 35, the number of teeth of the gear 30 and the number of teeth of the internal gear of the internal gear ring 29, respectively. Accordingly, if the internal gear ring 37 is fixed on the stand of the twisting machine, the internal gear ring 27 also is fixed even if the spindle rotates. If the number of teeth of the chain wheel 25 is set to be equal to that of the chain sprocket 24, then the cradle 6 does not turn on its own axis, that is, the cradle 6 merely revolves around the spindle 1 even if the spindle 1 rotates, so that the twisting-back operation is performed. Further, a chain sprocket 66 is fixed on the rotary shaft 28 of the cradle 6 and engaged with other chain sprockets 66', 66'' ... through a chain so as to cause the other cradles to perform the same movement as that of the cradle 6 to perform the twisting-back operation. In this case, if the internal gear ring is not fixed but rotated suitably, a suitable twisting-back angle can be given to the fed-out wire-like structure if that is desired.

The operation of feeding the wire-like structure from the bobbin will now be described. As shown in FIG. 4, a shaft 39 supported by bearings 40 and 40' is provided inside the rotary shaft 28 of the cradle 6 and a belt pulley 41 is attached on the shaft 39 at its one end. The belt pulley 41 is coupled with a shaft 47 through a belt 42, a belt pulley 43, a shaft 44, and bevel gears 45 and 46, so that the bobbin 7 is rotated by the shaft 47. A timing belt pulley is attached onto the shaft 39 at its other end and coupled through a belt 50 with an outer timing belt pulley 52 of an internal gear ring 49 rotatably attached onto the spindle 1 through a bearing 51. A gear 53 engaged with the internal gear of the internal gear ring 49 is provided in the internal circle of the internal gear ring 49 and a rotary shaft 54 of the gear 53 is rotatably held by bearings 55 and 55' in a hole 38 inside the spindle 1, a gear 56 being attached on the rotary shaft 54 at its other end. The gear 56 engages with the internal gear of an internal gear ring 57 rotatably provided on the spindle 1 through a bearing 58 and the outer periphery of the internal gear ring 57 is formed into a belt pulley 59 which is coupled with a variable speed motor 61 through a belt 60.

In this arrangement, if the respective numbers of teeth of the internal gear of the internal gear ring 57, the gear 56, the gear 53, the internal gear ring 49, the timing belt pulley 52 and the timing belt pulley 48 are represented by $T_{57}$, $T_{56}$, $T_{53}$, $T_{49}$, $T_{52}$ and $T_{48}$, the following relation is satisfied:

$$(N_1 - N_3)i = N_2 - N_3$$

where $N_1$ represents the speed of rotation of the internal gear ring 57, $N_2$ represents the speed of rotation on its own axis of the timing belt pulley 48 with respect to the spindle 1 (the same as the speed of rotation with respect to the cradle 6) and $N_3$ represents the speed of rotation of the spindle 1, and where $$i = (T_{57}/T_{56}) \times (T_{53}/T_{49}) \times (T_{52}/T_{48}).$$

Accordingly, if the respective numbers of teeth of the gears are set to satisfy i=1, the relation $N_2 = N_1$ is satisfied independently of the speed of rotation of the spindle, that is the speed of revolution of the cradle 6. That is, the rotation with respect to the cradle of the belt pulley 48 which drives the bobbin 7 in the cradle 6 agrees with that of the belt pulley 59, that is the internal gear ring 57, driven by the variable speed motor 6. Accordingly, the speed of rotation of the variable speed motor 61 is proportional to that of the bobbin 7, so that the wire-like structure feeding speed from the bobbin 7 can be controlled by controlling the rotation of the variable speed motor 61.

Figure 5:
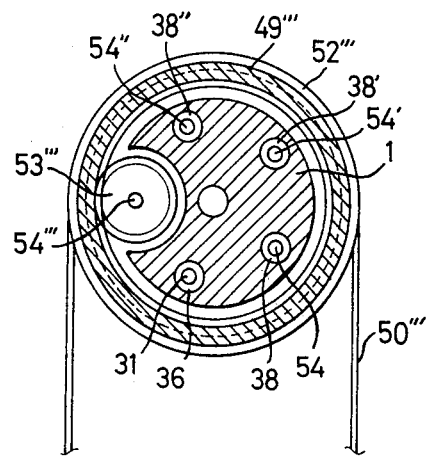
FIG. 5 is a cross-section of the device shown in FIG. 3, taken from the viewpoint C—C.

In a twisting maching having a plurality of cradles, the bobbin driving mechanism for each of the other cradles is the same as that described above. For example, the arrangement of the bobbin driving mechanism in the case where the twisting machine has four cradles is shown in FIG. 5. That is, an internal gear ring 49''' having a timing belt pulley 52''' for the fourth cradle is rotatably attached onto the spindle 1 at its outside and he the internal gear ring 49''' is driven by a gear 53''' so as to drive the bobbin in the fourth cradle from the timing belt pulley 52''' through the timing belt 50'''. A shaft 54''' of the gear 53''' is passed through the inside of the spindle, and a gear 56''' (not shown) is attached to the shaft 54''' at its other end and engaged with the internal gear of an internal gear ring 57''' driven by a variable speed motor 61''', whereby the structure bobbin speed in the fourth cradle is controlled. The shaft 31 for the twisting-back operation of the cradle is passed through the hole 36 formed in the spindle 1. Further, the shafts 54, 54', 54'' . . . for driving the respective bobbins of the first, the second, and the third cradle are passed through the holes 38, 38', 38'' . . . in the spindle. That is, according to this arrangement, the transmission shafts 54, 54', 54'' are arranged in the spindle in a circumference internal from the outer circumferences of all of the timing belt pulleys 52, 52', 52'' with which the timing belts 50, 50', 50'' are engaged. Internal gear rings 49 and the internal gear rings 57 are coupled with each other by the gears 53 and 56 provided at the opposite ends of the transmission shafts 54 to thereby drive the belt pulleys 52 in order to drive the timing belts for driving the bobbins of the respective cradles. The movement of the belts of the timing belts 50 is not affected even if the timing belts 50 revolve around the spindle 1. In addition, the rotation of the timing belt pulleys 52 can be performed by driving the group of the belt pulleys 59 with prime movers located outside of the body of the twisting machine.

In the wire-twisting machine described above, twisting is performed in the same manner as in the conventional twisting machine if the spindle 1 is rotated by a main motor 62 as shown in FIG. 3, and the wire-like structure wound on the bobbin 7 is fed through the guide rollers 10, 11 and 17 so as to be twisted. At this time, the position of the movable side guide roller 11 is detected by a position detecting device (not shown) so that a detection signal is fed back to a central controller 63 which controls the respective variable speed motors 61 and the others to thereby control the bobbin speed feeding the respective wire-like structures to substantially fix the position of the guide roller 11. Thus, the wire twisting is performed with substantially constant low tension.

Although the belt pulleys 52 and 59 are provided on the outer side of the internal gear rings, as described above, a similar operation can be performed by driving the shaft 39, which drives the bobbins of the cradles by using gear trains in place of belt driving. This arrangement becomes a cage type wire-twisting machine which operates without twisting-back if the rotation of the internal gear ring 37 is made the same as that of the spindle, while it becomes a twisting machine which operates with a suitable twisting-back angle if the internal gear ring 37 is suitably rotated. In either case, the arrangement is applicable and in that case it will do to incorporate a differential mechanism into the prime mover position between the variable speed motor and the belt pulleys 52.

Figure 6:
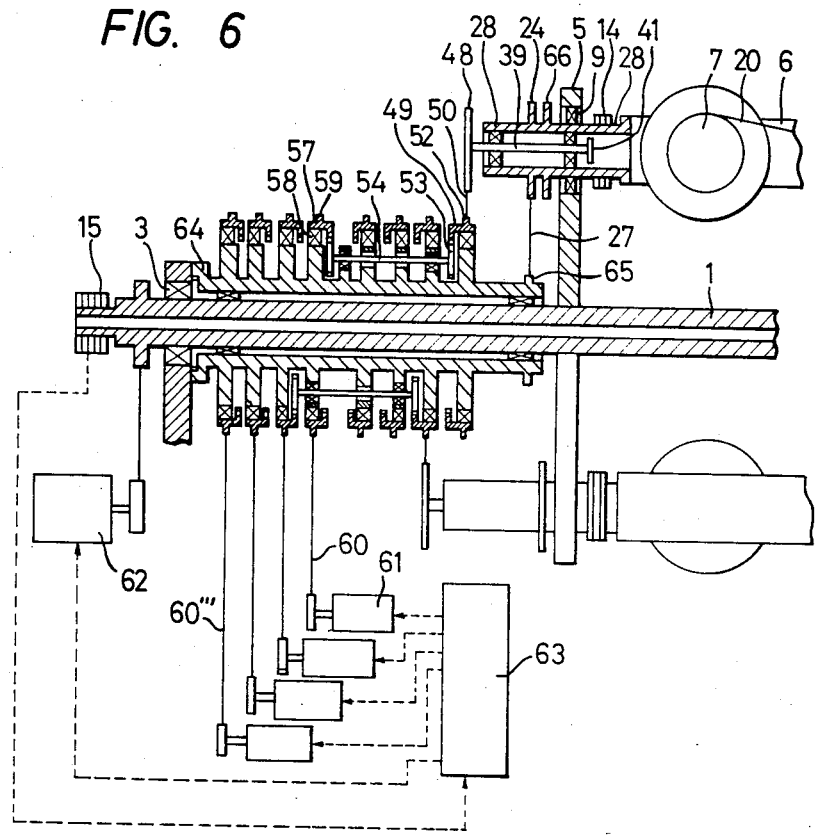
FIG. 6 is a front view, partly in section with respect to the main part, of the wire-twisting machine according to a preferred embodiment of the present invention.

FIG. 6 shows another embodiment of the present invention in which the construction of the cradle is the same as that in the previous embodiment. In this embodiment, a hollow shaft 64 is provided at the outer circumference of, and coaxially with, the spindle 1 and fixed at its one end onto the stand of the twisting machine. A chain sprocket 65 is fixed onto the hollow shaft 64 at its other end and coupled through the chain 27 with the chain sprocket 24 fixed onto the shaft 28 of the cradle. If the respective numbers of teeth of the two chain sprockets are set to be equal to each other, the respective cradle does not turn on its own axis because the hollow shaft 64 is fixed in the space, so that complete twisting-back can be obtained. Similarly to the previous case, the group of the internal gear rings 49 and the others having the timing belt pulley 52 coupled through the timing belt 50 with the timing belt pulley 48 provided on the shaft 39 for driving the bobbin are provided for each of the cradles, the shaft of the gear 53 engages with the internal gear of the internal gear ring 49, the shaft of the gear 53 passes through the hollow shaft 64 so that the gear 56 at the other end of the same shaft engages with the internal gear of the internal gear ring 57, and each of the group of the internal gear rings 57 and the others is coupled to the variable speed motor 61 through the outer belt pulley 59 of the respective internal gear ring and driven by the motor. Accordingly, also in this arrangement, the wire-like substance feeding speed from the bobbin can be controlled from the outside of the twisting machine. That is, in the case where 100% twisting-back is performed in this embodiment, the twisting-back mechanism can be simplified in comparison with the previous embodiment.

While the invention has been described in detail and with reference to specific embodiments thereof, it will be apparent to one skilled in the art that various changes and modifications can be made therein without departing from the spirit and scope thereof.

We claim:

1. Apparatus for twisting a plurality of wirelike structures into a cable with a twisting-back angle, comprising; a plurality of bobbins, a plurality of cradles each having an axially mounted supporting shaft, a cage, and a cage rotating spindle, wherein said wire-like structures are wound on said plurality of bobbins, each of which is supported in said cage, said cage rotating around said cage-rotating spindle, a separate driving system for each said bobbin, respectively comprising, a first chain sprocket coupled axially on said cradle, a chain wheel coaxial with said cage-rotating spindle and rotatable with respect to said cage-rotating spindle, a plurality of motors provided externally to said cage, and a rotation transmission means disposed internally of said respective chain wheel to engage an inner side surface of said chain wheel so that said respective chain wheels are driven by said rotation transmission means at said inner surface by said motors, wherein said motors control the bobbin feeding speed of said wire-like structures so as to twist said wire-like structures with constant tension.

2. The apparatus according to claim 1, wherein each of said chain wheels further comprises a pair of internal gear rings, and said rotation transmission means comprises a pair of internal gears and a common shaft, said internal gears being located on opposite ends of said common shaft, and wherein said pair of internal gear rings are engaged by said pair of internal gears.

3. The apparatus according to claim 2 wherein said chain wheel is rotatable on said spindle, said first chain sprocket, is coupled axially with said supporting shaft for rotating said shaft of said respective cradle, and means for coupling said respective chain wheels to said respective first chain sprockets, wherein, the amount of said twisting-back angle being dependent on the relative rotation between said chain wheel and said spindle.

4. The apparatus according to claim 2, further comprising a hollow shaft provided coaxially with and at the outer circumference of said cage rotating spindle such that said spindle passes through said hollow shaft, a second chain sprocket or a gear is provided on each cradle at one end of each of said respective shafts and a chain for coupling each said respective cradles together for performing the twisting-back, first chain sprocket being rotatably provided on the outer circumference of said hollow shaft.

5. The apparatus according to claim 1 wherein said chain wheel is rotatable on said spindle, said first chain sprocket is coupled axially with said supporting shaft for rotating said shaft of said respective cradle, and means for coupling said respective chain wheels to said respective first chain sprockets, wherein, the amount of said twisting-back angle being dependent on the relative rotation between said chain wheel and said spindle.

6. The apparatus according to claim 1, further comprising a hollow shaft provided coaxially with and at the other circumference of said cage rotating spindle such that said spindle passes through said hollow shaft, a second chain sprocket or a gear is provided on each cradle at one end of each of said respective shafts and a chain for coupling each said respective cradles together for performing the twisting-back, said first chain sprocket being rotatably provided on the outer circumference of said hollow shaft.

* * * * *